United States Patent [19]

Logsdon

[11] Patent Number: 4,903,921

[45] Date of Patent: Feb. 27, 1990

[54] PIPE HOLDERS

[75] Inventor: Duane D. Logsdon, Fullerton, Calif.

[73] Assignee: Logsdon Foundation, Stanton, Calif.

[21] Appl. No.: 290,985

[22] Filed: Dec. 28, 1988

[51] Int. Cl.$^4$ ................................................. F16L 3/08
[52] U.S. Cl. ................................... 248/74.5; 248/74.1
[58] Field of Search .................... 248/74.5, 74.1, 74.2,
248/56, 74.3; 24/530, 531, 532, 533, 534, 543, 339

[56] References Cited

U.S. PATENT DOCUMENTS

| 3,684,220 | 8/1972 | Logsdon | 248/56 |
|---|---|---|---|
| 3,684,223 | 8/1972 | Logsdon | 248/74.3 |
| 4,358,080 | 11/1982 | Wolker | 24/339 X |
| 4,442,994 | 4/1984 | Logsdon | 248/74.3 |
| 4,467,988 | 8/1984 | Kraus | 248/74.1 |
| 4,470,179 | 9/1984 | Gollin | 24/543 |
| 4,591,119 | 5/1986 | Kraus | 248/74.2 |

FOREIGN PATENT DOCUMENTS

| 3029975 | 3/1982 | Fed. Rep. of Germany | 248/74.2 |
|---|---|---|---|
| 1312586 | 11/1961 | France | 248/74.5 |
| 1376738 | 12/1974 | United Kingdom | 248/74.2 |
| 2092216 | 8/1982 | United Kingdom | 248/74.2 |

Primary Examiner—J. Franklin Foss
Attorney, Agent, or Firm—Price, Gess & Ubell

[57] ABSTRACT

The application of stresses which might cause damage to a pipe or tube when the pipe or tube is held by a holder or clam can normally be avoided by using fins on the holder which resiliently engage the pipe and which do not press any sharp edges directly into the periphery of the pipe.

12 Claims, 1 Drawing Sheet

PIPE HOLDERS

BACKGROUND OF THE INVENTION

The invention set forth in this specification pertains to new and improved pipe holders. More specifically it pertains to pipe holders corresponding to prior or known pipe holders but differing from such prior or known pipe holders as a result of having been modified so as to use substantially triangular pipe supporting fins constructed as subsequently described. Such fins are employed to engage and support pipes or tubes so that such pipes or tubes are not apt to become damaged and in such a manner so as to minimize sound and heat transmission from such pipes and to avoid such pipes being electrolytically attacked.

The prior or known holders mentioned in the preceding paragraph can be constructed in many different manners. Because of this it is considered impractical to try and set forth in this specification all of the various holders which can be modified in accordance with the concepts of the invention. The holders which can be constructed so as to use the concepts of the invention will normally be comparatively simple holders designed to have substantially cylindrical internal surfaces designed to be opposed to the external surfaces of pipe so as to support such pipe.

It is believed that the present invention will be most beneficial when used with comparatively uncomplex pipe holders or clamps constructed as one piece integral units out of a polymer material or composition having a moderate degree of resiliency and flexibility such as is possessed by common grades of polyethylene, polypropylene, various common plasticized vinyl compositions and the like as are currently employed in the manufacture of holders and claims which are reasonably related to those described in this specification.. At the present time there are many known polymers possessing these physical properties. Many of them are blends of known polymer materials.

Normally such holders or camps will be formed so as to include a plurality of spaced internal "Vee" shaped or more or less arrow head shaped ridges extending radially inwardly from the cylindrical surfaces in such a manner that the pointed ends of the these ridges engage the pipes held by such holders at at least three different locations around the peripheries of such pipes in order to firms support such pipes. In order to achieve such a supporting action the ridges usually extend parallel to the axes of the cylindrical surfaces and are located so that when a pipe is in position in such a holder they are closer to the axis of the cylindrical surface than the periphery of the pipe. As a consequence of this any pipe held in such a holder is held under compression as a result of a limited amount of material deformation in connection with the ridges and/or the body of the older adjacent to the surface upon which the ridges are located.

This can be easily comprehended by a consideration of clamps or holders such as are disclosed inthe U.S. Pat. Nos. 3,684,223 and 3,684,220. Although the clamps or holders disclosed in these patents are effective, desirable devices their desirability is somewhat limited by virtue of the fact that as they are used the pointed ridges or fins disclosed in them will frequently tend to apply pressure directly toward the axis of a pipe more or less like a point of an arrow will tend to apply pressure to the skin on a finger as it is pressed towards the finger. Although this is not often serious in some circumstances it can be significant. The latter is particularly the case when the pipe supported has a comparatively thin periphery wall.

This situation is particularly of concern when the pipe is a comparatively thin walled tube which can be easily distended or cracked when held under pressure. On occasion such tube are formed of materials which are prone to "stress cracking". This means that they will tend to crack open when held under significant compression or tension for a prolonged period. It is believed that such stress cracking of many common types of tubes is particularly significant when they are held under compression for a prolonged period against comparatively sharp ridges or fins as are disclosed in the patents mentioned in the preceding. It is also believed that such stress cracking of pipes or tubes is particularly significant in connection with comparatively thin walled tubes of thermoplastic materials, especially when such tubes are used with comparatively hot fluids or in a comparatively hot environment.

BRIEF SUMMARY OF THE INVENTION

As a result of recognition of the problem indicated inthe preceding discussion it is considered clearly evident that there is a need for new and improved pipe holders which overcome the problem of stress cracking in pipe holders of the type described. A broad objective of this invention is to provide new and improved pipe holders which are not apt to lead to stress cracking in even comparatively thin walled, thermoplastic tubing or pipe even when they are used inn supporting such pipe or tubing and such pipe or tubing is manufactured out of a polymer composition which is prone to stress cracking and when the conditions of use are such as to promote stress cracking.

The invention is also intended to provide new and improved pipe hangers or clamps as indicated in the preceding sentence which can be manufactured at a comparatively nominal cost and which are capable of being used for a virtually indefinite period without there being any need for either these holders or pipes held by them be ing replaced as a result of anything associated with these holders or clamps. In connection with this it is to be noted that the invention itself is not primarily concerned with the way a holder or clamp is mounted relative to a support such as a stud as it is used or with the "fundamental" manner in which the holder or clamp is positioned so that it can support a tube or pipe. Instead the invention relates to the nature of the ridges or fins used in such a holder or clamp to physically engage the periphery of a tube or pipe and the nature of holding action of such ridges or fins. Thus, the invention set forth in this specification is applicable to a wide variety of differently constructed pipe holders or clamps.

In accordance with this invention the various objectives of it as indicated in the preceding are achieved by providing a pipe holder having a body portion, means on said body portion for attaching said body portion to a support member, an at least partially cylindrical surface of larger diameter than a pipe to be held by said holder located on said body portion and a plurality of fins for engaging a pipe located on said cylindrical surface so as to extend therefrom in which the improvement comprises:

said fins being identical fins formed of a self-supporting, resilient, flexible material, each of said fins being of a substantially triangular cross-sectional configuration and having a base and two sides or unequal length, said sides being joined to one another by an apex and being joined to said base by corners, the base of each of said fins extending along and being joined with said cylindrical surface between said corners, when each of said fins is viewed in cross-section the angle between a line connecting the apex of the fin to the midpoint of a line extending between the corners of the fin and the latter line being such that as a pipe is held within said holder the apex will not contact the periphery of the pipe so as to tend to be directed towards the periphery so as to tend to pierce it, the length of said line connecting said apex and the midpoint of the said line extending between said corners being sufficiently long and the length of said line extending between said corners being sufficiently short so that said fin will be bent from its normal configuration between its apex and its base as it is used to hold a pipe said fins being sufficiently resilient so that a pipe held by said fins is resiliently supported by said fins.

BRIEF DESCRIPTION OF THE DRAWING

Because of the nature of the present invention it is best more fully described by reference to the accompanying drawing it which.

Figure 1:
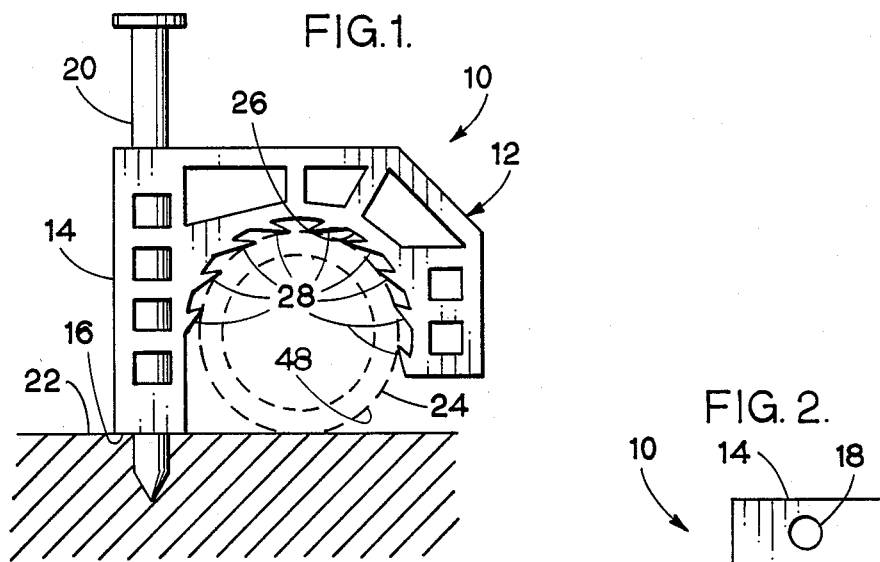
FIG. 1 is a side elevational view of a presently preferred embodiment or form of a pipe holder or clamp of the present invention.
Figure 2:
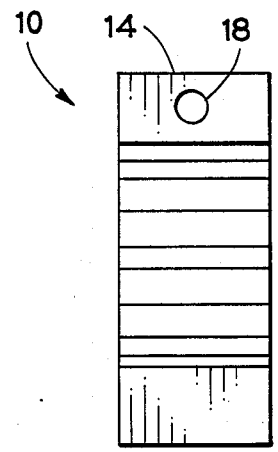
FIG. 2 is a bottom plan view thereof.

The two holders or clamps illustrated in the drawing embody the concepts of the invention as are sent forth and defined in the appended claims. As those familiar with the design and construction of pipe and tubing clamps and holders will realize these concepts can be embodied within a number of other differently constructed pipes and holders which are closely related to various known clamps and holders through the use of routine skill in this field of pipe clamps and holders. For this reason the present invention is to be considered as being limited only by the appended claims. This claims are to be considered as forming a part of this specification.

DETAILED DESCRIPTION OF THE PREFERRED EMBODIMENTS

In the initial two figures of the drawing there is a shown a pipe holder 10 in accordance with this invention which is constructed as a unitary structure ( not separately numbered) out of a somewhat resilient, somewhat flexible material such as polyethylene, polypropylene, various common plasticized vinyl compositions or the like.. When present in a comparatively large mass such materials are subsequently inflexible. As normally used such materials are self-supporting. It is also well know that there are many known polymer blends possessing the same or substantially those physical properties as the polymers specifically mentioned. The mentioned materials are all thermoplastic and can all be formed into holders within the scope of the invention by conventional manufacturing techniques.

As formed the holder 10 includes a body portion 12 having an upstanding side 14 terminating in a flat bottom 16. This side 14 includes a vertically extending hole 18 which is adapted to receive a conventional fastener 20 such as a nail as illustrated used in installing the holder 10 in a desired location against a surface 22. Such a surface 22 can be on a wall, a stud or the like. When the holder 10 is so installed the bottom 16 will fit against the surface 22 so as to clamp a tube or pipe 24 between the surface 22 and a generally cylindrical surface 26 on the body portion. Normally this surface 22 will have a slightly larger diameter than the pipe 24. Normally a plurality of ribs or fins 28 will be formed integrally with the body portion 12.

As will have been apparent from the preceding discussion the construction of these fins 28 is quite important to the present invention. They are all preferably identically formed although if desired they may be differ slightly from one another where this is desirable because of a molding problem or some other complication. The important thing is that they all "perform" in the same manner as the holder 10 is used. These fins 28 all extend parallel to the axis or center (not separately designated) of the surface 26 along the entire distance between the sides 30 of the holder 10. Each of these fins 28 has a cross-sectional shape or configuration as illustrated in FIG. 3.

Figure 3:
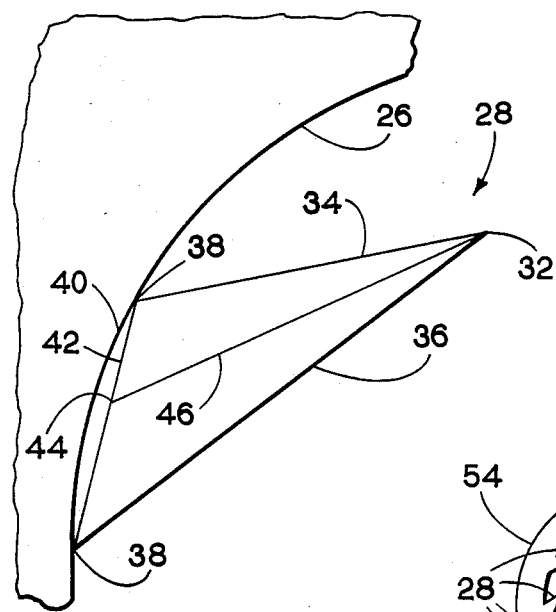
FIG. 3 is an enlarged partial side elevational view corresponding to part of FIG. 1 containing various lines subsequently used to explain the construction of the fins.

From a consideration of this FIG. 3 it will be apparent that each of the fins 28 has an apex 32 joining a short side 34 and a long side 36 and corners 38 joining its base 40. The base 40 is integral with the surface 22. Because of the curvature of the surface 22 the actual shape of the base 40 as shown in FIG. 3 is slightly curved. In those comparatively limited cases when a fin 28 may be used on a flat surface the base 28 will be flat. Because of the curvature of the base 40 in defining the shape of a fin 28 it is necessary to consider that each fin 28 when viewed in cross-section has an intangible line 42 joining its corners 38. It is also considered necessary to consider that the mid-point 44 of the line 42 is connected to the apex 32 by another intangible line 46. Because of the fact that the sides 34 and 36 are of unequal length the line 46 is slanted slightly with respect to the line 42.

This slope is important. It should be sufficiently great so that the apex 32 of any and all fins 28 used will not directly be pointed at the periphery 48 of the pipe 24 when the holder 10 is being installed or used. This will avoid any tendency for the apex 32 to act more or less like a shape ridge (not shown) of the point of an arrow (not shown) so as to tend to pierce or apply line pressure to the pipe 24. This is important in minimizing stress cracking or the like of the pipe or tube 24 when the latter is formed of a polymer material. Because of the variation possible with the invention this slope can vary significantly. It is presently considered that best results are achieved when the smaller of the two angles between the lines 46 and 42 is at least 60 degrees and is within the range of from about 30 to about 60 degrees.

When each fin 28 used is so sloped and is sufficiently long and thin so as to be capable of flexing between its base 42 and its apex 32 as it is brought into contact with the periphery 48 of the pipe 24 as it installed the longer sides 36 of the fins 28 will resiliently engage the pipe 24 so that the forces applied to it as it is is held are reasonably distributed and so that no force is concentrated against the periphery 48 of the pipe. In order to achieve the desired action it is considered that the length of the line 46 should be at least 50% longer than that of the line 42. It is also considered that that the length of the line 46 should not be so long that the fins 28 are so thin that they flex so easily that they are incapable of supporting a pipe 24. For this reason it is currently believed that normally with pipe as is commonly employed for plumbing work that the length of the line 46 should be no greater than about 300% of the length of the line 42.

Figure 4:
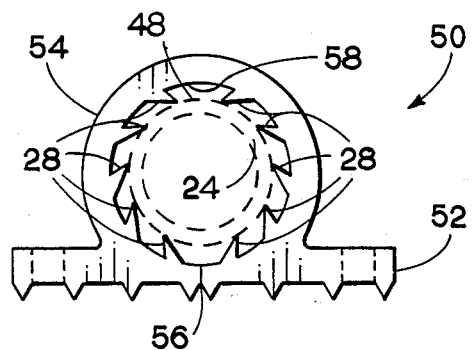
FIG. 4 is a side elevational view of an alternative embodiment of the invention.

FIG. 4 has been shown in the drawing to illustrate that the concepts of the invention are not only applicable to a single type of pipe holder or clamp. In this figure there is shown another holder 50 which is formed as an integral unit of a material as discussed in the preceding so as to have a blat base 52 holding a cylinder 54 which is adapted to receive a pipe (not shown). This base 52 is provided with a slot 56 leading into through the internal surface 58 of the cylinder 54 so that the the base 52 can be distended so as to pop a pipe against various fins 28 corresponding to the fins previously described as the holder 50 is installed. These fins 28 extend from the surface 58 in the manner previously indicated. The base 52 is adapted to be mounted in an convenient manner.

I claim:

1. A pipe holder having a body portion, means on said body portion for attaching said body portion to a support member, an at least partially cylindrical surface of larger diameter than a pipe to be held by said holder located on said body portion, and a plurality of fins for engaging a pipe located on said cylindrical surface so as to extend therefrom in which the improvement comprises:

said fins being identical fins formed of a self-supporting, resilient, flexible material, each of said fins being of a substantially triangular cross-sectional configuration and having a base and two sides of unequal length, said sides being joined to one another by an apex and being joined to said base by corners, the base of each of said fins extending along and being joined with said cylindrical surface between said corners, when each of said fins is viewed in cross-section the angle between a line connecting the apex of the fin to the midpoint of a line extending between the corners of the fin and the latter line being such that as a pipe is held within said holder, the longer of said sides abuts said pipe such that the apex will not contact the periphery of the pipe so as to tend to be directed towards the periphery so as to tend to pierce it, the length of said line connecting said apex and the midpoint of said line extending between said corners being sufficiently long and the length of said line extending between said corners being sufficiently short so that said fin will be bent from its normal configuration between its apex and its base as it is used to hold a pipe, said fins being sufficiently resilient so that a pipe held by said fins is resiliently supported by said fins.

2. A holder as claimed in claim 1 wherein:
said angle is an angle of from about 30 to about 60 degrees.

3. A holder as claimed in claim 1 wherein:
the length of said line connecting said apex is at least 150% of the length of said line extending between said corners.

4. A holder as claimed in claim 3 wherein:
the length of said line connecting said apex is from about 150 to about 300% of the length of said line extending between said corners.

5. A holder as claimed in claim 1 wherein:
said angle is an angle of from about 30 to about 60 degrees, and
the length of said line connecting said apex is from about 150 to about 300% of the length of said line extending between said corners.

6. The holder of claim 1 wherein the fins on one half of said at least partially cylindrical surface comprise substantial mirror images of the fins on the opposite half of said at least partially cylindrical surface.

7. The holder of claim 6 wherein said plurality of tooth means comprises:

a plurality of teeth formed of a self-supporting, resilient, flexible material;

each of said teeth being of a substantially triangular cross-sectional configuration and having a base and two sides of unequal length, said sides being joined to one another by an apex and being joined to said base by corners, the base of each of said teeth extending along and being joined with said cylindrical surface between said corners;

when each of said teeth is viewed in cross-section, the angle between a line connecting the apex of the tooth to the midpoint of a line extending between the corners of the tooth and the latter line being such that, as a pipe is held within said holder, the longer of said sides abuts said pipe, such that the apex will not contact the periphery of the pipe so as to tend to be directed towards the periphery so as to tend to pierce it; and the length of said line connecting said apex and the midpoint of said line extending between said corners being sufficiently long and the length of said line extending between said corners being sufficiently short so that said tooth will be bent from its normal configuration between its apex and its base as it is used to hold a pipe, said teeth being sufficiently resilient so that a pipe held by said teeth is resiliently supported by said teeth.

8. A holder as claimed in claim 7 wherein said angle is an angle of from about 30 to about 60 degrees.

9. A holder as claimed in claim 7 wherein the length of said line connecting said apex is at least 150% of the length of said line extending between said corners.

10. A holder as claimed in claim 9 wherein the length of said line connecting said apex is from about 150 to about 300% of the length of said line extending between said corners.

11. A holder as claimed in claim 1 wherein:
said angle is an angle of from about 30 to about 60 degrees; and
the length of said line connecting said apex is from about 150 to about 300% of the length of said line extending between said corners.

12. A pipe clamp comprising:
a unitary structure formed of a flexible material formed to include;
an upstanding side terminating in a flat bottom, said upstanding side having a generally rectangular cross-section;
a vertical hole in said upstanding side forming a substantially circular opening in said cross-section;
a body portion cantilevered from said upstanding side, said body portion having an opening therein which is semicircular in a cross-sectional plane bisecting said circular opening, said opening thereby being positioned to exert a vertical downward force component on a pipe placed between said opening and a surface when said flat bottom is placed on said surface and a fastener is inserted through said opening into said surface to create said force; and a plurality of tooth means positioned about said semicircular opening of said cantilevered member for applying said vertical force component to said pipe and for resiliently distributing said force component about said semicircular opening so as to relieve stress upon said pipe.

* * * * *